(12) United States Patent
Hetani

(10) Patent No.: US 12,342,020 B2
(45) Date of Patent: Jun. 24, 2025

(54) ADVERTISEMENT DISPLAY APPARATUS, METHOD, AND NON-TRANSITORY COMPUTER READABLE MEDIUM

(71) Applicant: JVCKENWOOD Corporation, Yokohama (JP)

(72) Inventor: Hidenori Hetani, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/387,324

(22) Filed: Nov. 6, 2023

(65) Prior Publication Data

US 2024/0155169 A1    May 9, 2024

(30) Foreign Application Priority Data

Nov. 7, 2022  (JP) ................. 2022-177858
Sep. 14, 2023 (JP) ................. 2023-149517

(51) Int. Cl.
*H04N 21/262* (2011.01)
*H04N 21/258* (2011.01)
*H04N 21/81* (2011.01)

(52) U.S. Cl.
CPC . *H04N 21/26241* (2013.01); *H04N 21/25841* (2013.01); *H04N 21/812* (2013.01)

(58) Field of Classification Search
CPC ................................... H04N 21/26241
See application file for complete search history.

(56) References Cited

U.S. PATENT DOCUMENTS

2014/0040016 A1*  2/2014  Amla ............... G06Q 30/0267
                                                705/14.63

FOREIGN PATENT DOCUMENTS

JP         2008-092276 A    4/2008

* cited by examiner

*Primary Examiner* — Michael H Hong
(74) *Attorney, Agent, or Firm* — Procopio, Cory, Hargreaves & Savitch LLP

(57) ABSTRACT

An advertisement display apparatus, a method, and a non-transitory computer readable medium capable of calculating a display time for efficiently displaying an advertisement to a viewer are provided. An advertisement display apparatus according to the present disclosure includes an acquisition unit and a calculation unit. The acquisition unit acquires information about a region where a viewing terminal is located. The calculation unit calculates, for each region where a viewing terminal is located, the number of viewing terminals in that region based on information about that region, and calculate, for each region, a display time of an advertisement in that region based on the number of viewing terminals in that region.

7 Claims, 13 Drawing Sheets

| Region Number | Name of Country | Name of Region | Viewer Terminal Number | Advertisement Display Base Time |
|---|---|---|---|---|
| 1 | USA | New York | 3,000 | 45 Sec. |
| 2 | USA | Los Angeles | 2,000 | 30 Sec. |
| 3 | USA | Seattle | 1,500 | 30 Sec. |
| 4 | China | Beijing | 5,000 | 1 Min. |
| 5 | China | Shanghai | 4,000 | 1 Min. |
| 6 | China | Guangzhou | 1,000 | 30 Sec. |
| 7 | France | Paris | 500 | 30 Sec. |
| 8 | France | Lyon | 300 | 30 Sec. |
| 9 | France | Toulouse | 100 | 30 Sec. |
| 10 | Japan | Tokyo | 10,000 | 1 Min. |
| 11 | Japan | Osaka | 8,000 | 1 Min. |
| 12 | Japan | Fukuoka | 5,000 | 1 Min. |
| 13 | Australia | Canberra | 2,000 | 30 Sec. |
| 14 | Australia | Sydney | 1,500 | 30 Sec. |
| 15 | Australia | Melbourne | 1,000 | 30 Sec. |

Fig. 4

| | |
|---|---|
| TORAL VIEWER TERMINAL NUMBER | 44,900 |
| NUMBER OF REGIONS | 15 |
| VIEWER TERMINAL NUMBER AVERAGE VALUE | 2,993 |
| VIEWER TERMINAL NUMBER AVERAGE VALUE ×1.2 | 3,592 |
| VIEWER TERMINAL NUMBER AVERAGE VALUE ×0.8 | 2,395 |

Fig. 5

| ADVERTISEMENT ID | ADVERTISEMENT TYPE |
|---|---|
| 00001 | TYPE A |
| 00002 | TYPE B |
| 00003 | NOT DESIGNATED |
| 00004 | TYPE A |
| 00005 | TYPE B |
| 00006 | TYPE C |
| 00007 | TYPE D |
| 00008 | NOT DESIGNATED |
| 00009 | TYPE C |
| 00010 | NOT DESIGNATED |
| 00011 | NOT DESIGNATED |
| 00012 | TYPE D |
| 00013 | TYPE B |
| 00014 | TYPE A |
| 00015 | TYPE D |
| 00016 | TYPE C |
| 00017 | TYPE B |
| 00018 | NOT DESIGNATED |
| 00019 | NOT DESIGNATED |
| 00020 | TYPE A |
| 00021 | TYPE C |

Fig. 6

| ADVERTISEMENT TYPE | ADVERTISEMENT TYPE COEFFICIENT |
|---|---|
| TYPE A | 1.0 |
| TYPE B | 0.8 |
| TYPE C | 0.5 |
| TYPE D | 0.3 |
| NOT DESIGNATED | 1.0 |

Fig. 7

| Advertisement Type | Time Zone | Detail of Time Zone | Time Zone Coefficient |
|---|---|---|---|
| Advertisement A | Time Zone 1 | 0:00 - 6:00 | 0.1 |
| | Time Zone 2 | 6:00 - 12:00 | 0.2 |
| | Time Zone 3 | 12:00 - 18:00 | 0.5 |
| | Time Zone 4 | 18:00 - 21:00 | 1.0 |
| | Time Zone 5 | 21:00 - 0:00 | 0.7 |
| Advertisement B | Time Zone 1 | 0:00 - 6:00 | 0.1 |
| | Time Zone 2 | 6:00 - 12:00 | 1.0 |
| | Time Zone 3 | 12:00 - 18:00 | 0.5 |
| | Time Zone 4 | 18:00 - 21:00 | 0.2 |
| | Time Zone 5 | 21:00 - 0:00 | 0.7 |
| Advertisement C | Time Zone 1 | 0:00 - 6:00 | 0.1 |
| | Time Zone 2 | 6:00 - 12:00 | 0.2 |
| | Time Zone 3 | 12:00 - 18:00 | 1.0 |
| | Time Zone 4 | 18:00 - 21:00 | 0.5 |
| | Time Zone 5 | 21:00 - 0:00 | 0.7 |
| Advertisement D | Time Zone 1 | 0:00 - 6:00 | 0.1 |
| | Time Zone 2 | 6:00 - 12:00 | 0.2 |
| | Time Zone 3 | 12:00 - 18:00 | 0.5 |
| | Time Zone 4 | 18:00 - 21:00 | 0.7 |
| | Time Zone 5 | 21:00 - 0:00 | 1.0 |

Fig. 9

| Region Number | Name of Country | Name of Region | Time Zone |
|---|---|---|---|
| 1 | USA | New York | Time Zone 2 |
| 2 | USA | Los Angeles | Time Zone 1 |
| 3 | USA | Seattle | Time Zone 1 |
| 4 | China | Beijing | Time Zone 4 |
| 5 | China | Shanghai | Time Zone 4 |
| 6 | China | Guangzhou | Time Zone 4 |
| 7 | France | Paris | Time Zone 3 |
| 8 | France | Lyon | Time Zone 3 |
| 9 | France | Toulouse | Time Zone 3 |
| 10 | Japan | Tokyo | Time Zone 4 |
| 11 | Japan | Osaka | Time Zone 4 |
| 12 | Japan | Fukuoka | Time Zone 4 |
| 13 | Australia | Canberra | Time Zone 4 |
| 14 | Australia | Sydney | Time Zone 4 |
| 15 | Australia | Melbourne | Time Zone 4 |

Fig. 10

ADVERTISEMENT DISPLAY APPARATUS, METHOD, AND NON-TRANSITORY COMPUTER READABLE MEDIUM

CROSS REFERENCE TO RELATED APPLICATION

This application is based upon and claims the benefit of priority from Japanese patent application No. 2022-177858, filed on Nov. 7, 2022 and Japanese patent application No. 2023-149517, filed on Sep. 14, 2023, the disclosure of which is incorporated herein in its entirety by reference.

BACKGROUND

The present disclosure relates to an advertisement display apparatus, a method, and a non-transitory computer readable medium.

Patent Literature 1 (Japanese Unexamined Patent Application Publication No. 2008-92276) discloses a broadcasting system. This broadcasting system assigns weights to regions registered in a content database based on the usage state of searches for regions or movements to regions acquired from a search server. The broadcasting system selects a content in each region according to the weight assigned to each region.

SUMMARY

In the technology disclosed in Patent Literature 1, there is room for improvement in efficiently displaying advertisements to viewers.

An advertisement display apparatus according to the present disclosure includes:
  an acquisition unit configured to acquire information about a region where a viewing terminal is located; and
  a calculation unit configured to calculate, for each region where a viewing terminal is located, the number of viewing terminals in that region based on information on that region, and calculate, for each region, a display time of an advertisement in that region based on the number of viewing terminals in that region.

In a method according to the present disclosure, a computer:
  acquires information about a region where a viewing terminal is located; and
  calculates, for each region where a viewing terminal is located, the number of viewing terminals in that region based on information on that region, and calculates, for each region, a display time of an advertisement in that region based on the number of viewing terminals in that region.

A non-transitory computer readable medium according to the present disclosure stores a program for causing a computer to:
  acquire information about a region where a viewing terminal is located; and
  calculate, for each region where a viewing terminal is located, the number of viewing terminals in that region based on information on that region, and calculate, for each region, a display time of an advertisement in that region based on the number of viewing terminals in that region.

BRIEF DESCRIPTION OF THE DRAWINGS

The above and other aspects, advantages and features will be more apparent from the following description of certain embodiments taken in conjunction with the accompanying drawings, in which:

FIG. 4 shows an example of results of calculation of the advertisement display base time by the calculation unit 12 of the advertisement display apparatus 10 according to the first embodiment;

FIG. 5 shows an example of results of calculation of a viewing terminal average number by the calculation unit 12 of the advertisement display apparatus 10 according to the first embodiment;

FIG. 6 shows an example of advertisement type information in an advertisement display apparatus 20 according to a second embodiment;

FIG. 7 shows an example of advertisement type coefficient information in the advertisement display apparatus 20 according to the second embodiment;

FIG. 9 shows an example of time zone coefficient information of an advertisement display apparatus 30 according to a third embodiment;

FIG. 10 shows an example of time zone information of the advertisement display apparatus 30 in each region according to the third embodiment;

DETAILED DESCRIPTION

Figure 1:
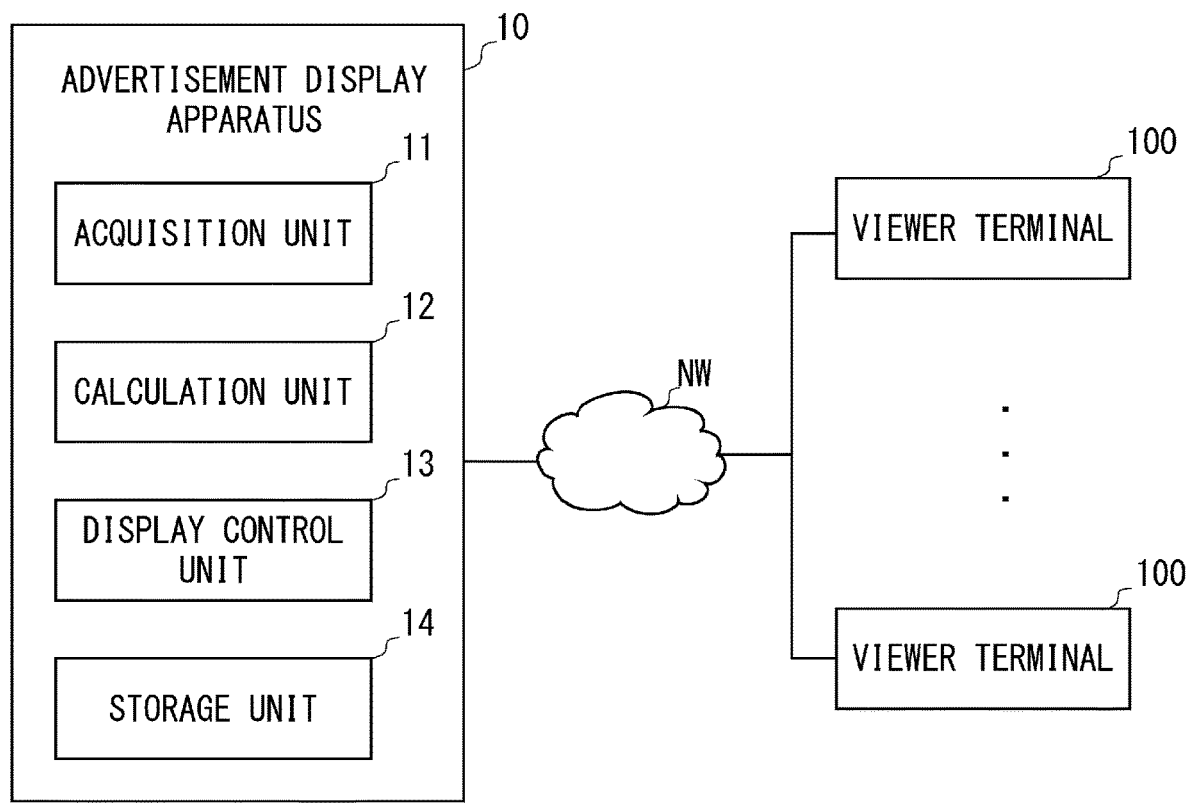
FIG. 1 is a block diagram showing an example of a configuration of an advertisement display apparatus 10 according to a first embodiment.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The first and second embodiments can be combined as desirable by one of ordinary skill in the art.

Embodiments according to the present disclosure will be described hereinafter in detail with reference to the drawings. The same or corresponding elements are denoted by the same reference numerals or symbols throughout the drawings, and redundant descriptions thereof are omitted as appropriate for clarifying the descriptions.

First Embodiment

Firstly, a configuration of an advertisement display apparatus 10 according to a first embodiment will be described with reference to FIG. 1.

FIG. 1 is a block diagram showing an example of the configuration of the advertisement display apparatus 10 according to the first embodiment. As shown in FIG. 1, the advertisement display apparatus 10 is, for example, a server, and its functional blocks may be implemented by using a plurality of computers. Further, all or some of the functions of the advertisement display apparatus 10 may be implemented by general purpose or dedicated circuitry such as a semiconductor device. A viewing terminal 100 is a terminal by which a user or the like views video images in which an advertisement is displayed by the advertisement display apparatus 10, which is, for example, a portable terminal such as a smartphone or a tablet-type computer, or a fixed terminal such as a PC (Personal Computer). The advertisement display apparatus 10 communicates with one or a plurality of viewing terminals 100 used by a user(s) through a network NW such as the Internet. Such communication is wireless communication or communication through a cable.

The advertisement display apparatus 10 makes a viewing terminal(s) 100 display an advertisement together with distributed video images (e.g., streaming video images) such as a video image of a live music performance or a live sports event. Specifically, the advertisement display apparatus 10 includes an acquisition unit 11, a calculation unit 12, a display control unit 13, and a storage unit 14.

The acquisition unit 11 acquires information about a region where a viewing terminal(s) 100 is located from the IP (Internet Protocol) address(es) or the like of the viewing terminal(s) 100. The information about regions is information indicating which regions in which countries viewing terminals 100 are located.

The calculation unit 12 calculates the number of viewing terminals 100 in each region. The calculation unit 12 calculates, for each region, a display time (hereinafter also referred to as an advertisement display base time) of an advertisement in that region based on the number of viewing terminals 100 present in that region. Specifically, the calculation unit 12 calculates the number of viewing terminals 100 in each region and calculates an average value of the calculated numbers of viewing terminals 100. The calculation unit 12 calculates, for each region, a display time (hereinafter also referred to as an advertisement display base time) of an advertisement in that region based on the number of viewing terminals 100 present in that region and the average value of the numbers of viewing terminals 100.

The display control unit 13 displays, in each region, an advertisement in the viewing terminal 100 for the advertisement display base time (i.e., for the duration of the advertisement display base time) determined for that region together with distributed video images. As the advertisement to be displayed, an advertisement targeted at a region in which the number of viewing terminals 100 is large is set. When there are a plurality of advertisements to be displayed, a set of advertisements may be prepared. The advertisement to be displayed is, for example, a wipe advertisement which is an advertisement combined into a distributed video image.

The storage unit 14 stores information and the like about advertisements to be displayed on viewing terminals 100.

Next, operations performed by the advertisement display apparatus 10 according to the first embodiment will be described with reference to FIGS. 2 to 5.

Figure 2:
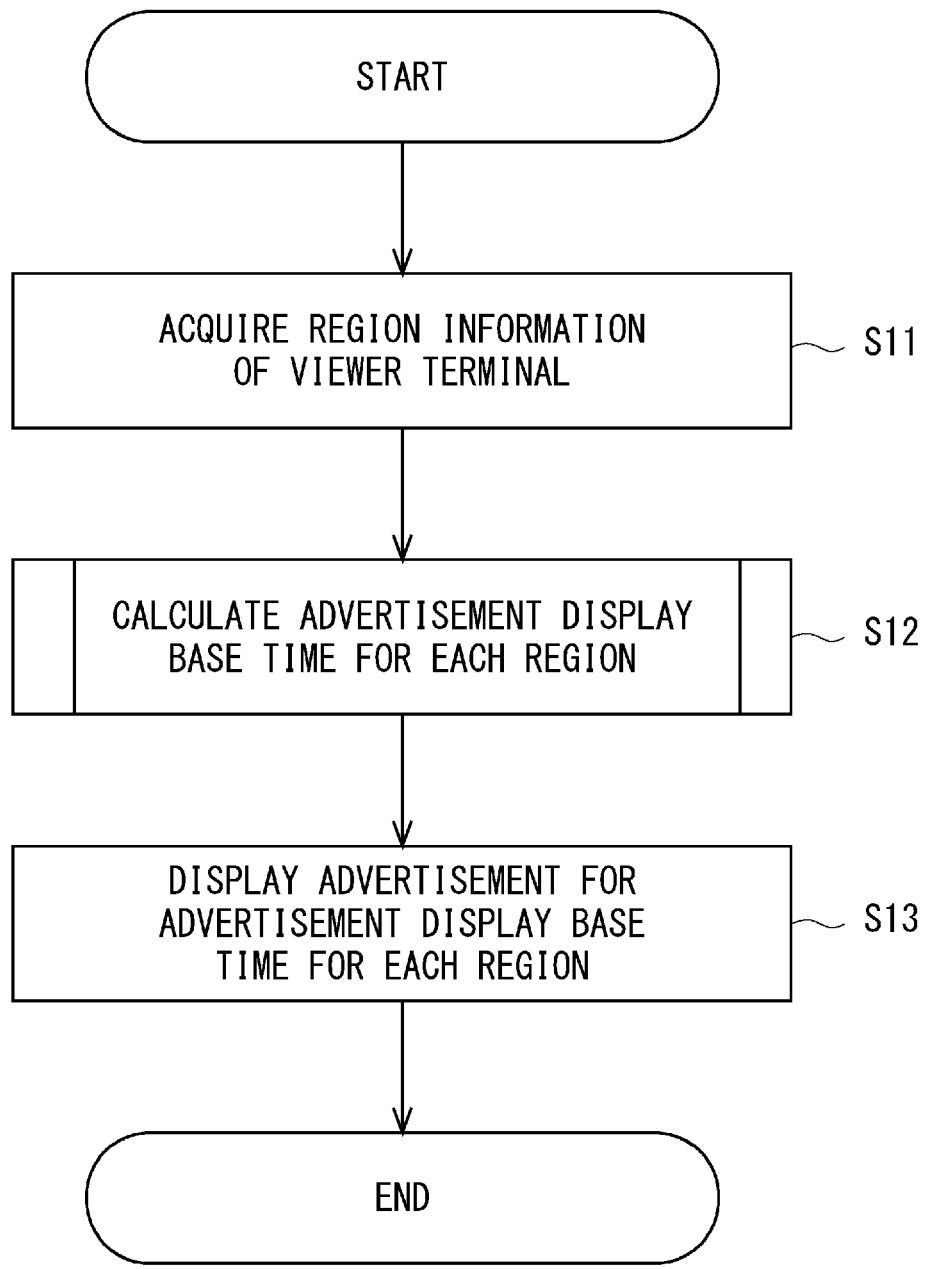
FIG. 2 is a flowchart showing an example of operations performed by the advertisement display apparatus 10 according to the first embodiment.

FIG. 2 is a flowchart showing an example of operations performed by the advertisement display apparatus 10 according to the first embodiment. As shown in FIG. 2, firstly, the acquisition unit 11 of the advertisement display apparatus 10 acquires information about regions where viewing terminals 100 are located (hereinafter also referred to as region information) (Step S11). Next, the calculation unit 12 calculates an advertisement display base time for each region based on the acquired region information of viewing terminals 100 (Step S12). Details of the step S12 will be described later with reference to FIG. 3. Next, the display control unit 13 displays an advertisement(s) on viewing terminals 100 for the advertisement display base time (i.e., for the duration of the advertisement display base time) determined for each region (Step S13).

Figure 3:
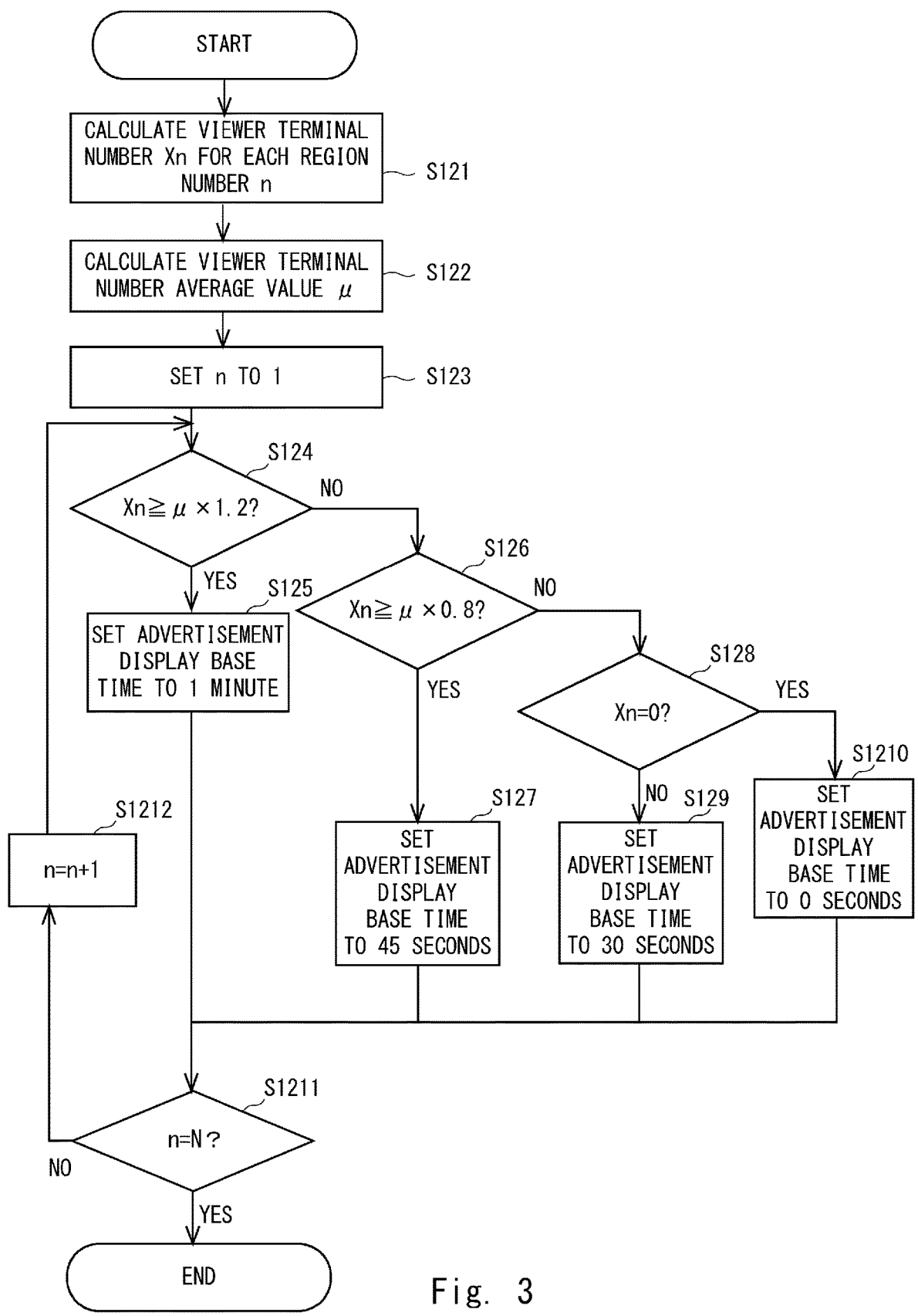
FIG. 3 is a flowchart showing an example of operations for calculating an advertisement display base time performed by a calculation unit 12 of the advertisement display apparatus 10 according to the first embodiment.

FIG. 3 is a flowchart showing an example of operations for calculating an advertisement display base time performed by the calculation unit of the advertisement display apparatus 10 according to the first embodiment.

As shown in FIG. 3, firstly, the calculation unit 12 calculates, for each region number n (n is a natural number between 1 and N), the number Xn (Xn is a natural number between X1 and XN) of viewing terminals 100 for that region number n based on the region information of viewing terminals 100 (Step S121). Hereinafter, the number Xn of viewing terminals 100 is also referred to as a viewing terminal number Xn. Next, the calculation unit 12 calculates an average value μ, of the viewing terminal numbers X1 to XN for the respective regions (Step S122). Hereinafter, the average value μ, of the viewing terminal numbers X1 to XN for the respective regions is referred to as a viewing terminal number average value μ.

Next, the calculation unit 12 sets 1 to the region number n (Step S123). Next, the calculation unit 12 determines whether or not the viewing terminal number Xn is equal to or greater than a value expressed as "Viewing terminal number average value μ×1.2" (Xn≥μ×1.2) (Step S124).

When it is determined that the viewing terminal number Xn is equal to or greater than the value expressed as "Viewing terminal number average value μ×1.2" in the step S124 (Yes in Step S124), the calculation unit 12 sets the advertisement display base time in the region number n to 1 minute (Step S125). Then, the calculation unit 12 proceeds to a process in a step S1211.

When it is determined that the viewing terminal number Xn is less than the value expressed as "Viewing terminal number average value μ×1.2" in the step S124 (No in Step S124), the calculation unit 12 determines whether or the viewing terminal number Xn is equal to or greater than a value expressed as "Viewing terminal number average value μ×0.8" (Xn≥μ×0.8) (Step S126).

When it is determined that the viewing terminal number Xn is equal to or greater than the value expressed as "Viewing terminal number average value μ×0.8" in the step S126 (Yes in Step S126), the calculation unit 12 sets the advertisement display base time in the region number n to 45 seconds (Step S127). Then, the calculation unit 12 proceeds to the process in the step S1211.

When it is determined that the viewing terminal number Xn is less than the value expressed as "Viewing terminal number average value µ×0.8" in the step S126 (No in Step S126), the calculation unit 12 determines whether or not the viewing terminal number Xn is zero (Step S128).

When it is determined that the viewing terminal number Xn is not zero in the step S128 (No in Step S128), the calculation unit 12 sets the advertisement display base time in the region number n to 30 seconds (Step S129). Then, the calculation unit 12 proceeds to the process in the step S1211.

When it is determined that the viewing terminal number Xn is zero in the step S128 (Yes in Step S128), the calculation unit 12 sets the advertisement display base time in the region number n to 0 seconds (Step S1210). Then, the calculation unit 12 proceeds to the process in the step S1211.

In the step S1211, the calculation unit 12 determines whether or not the region number n is N (n=N). When it is determined that the region number n is N (Yes in Step S1211), the calculation unit 12 finishes the series of processes. On the other hand, when it is determined that the region number n is not N (No in Step S1211), the calculation unit 12 proceeds to the process in the step S1212.

In the step S1212, the calculation unit 12 adds 1 to the region number n (n=n+1). Then, the calculation unit 12 returns to the process in the step S124.

FIG. 4 shows an example of results of calculation of the advertisement display base time performed by the calculation unit 12 of the advertisement display apparatus 10 according to the first embodiment.

In the example shown in FIG. 4, an advertisement display base time is calculated in each of 15 regions, i.e., New York, Los Angeles, and Seattle in the United States; Beijing, Shanghai, and Guangzhou in China; Paris, Lyon, and Toulouse in France; Tokyo, Osaka, and Fukuoka in Japan; and Canberra, Sydney, and Melbourne in Australia.

Further, the number of viewing terminals (hereinafter also referred to as a viewing terminal number) calculated for each of the 15 regions is, for example, 3,000 in New York in the United States. The viewing terminal number in Paris in France is 500. The viewing terminal number in Tokyo in Japan is 10,000.

FIG. 5 shows an example of results of calculation of the viewing terminal number average value performed by the calculation unit 12 of the advertisement display apparatus 10 according to the first embodiment.

In the example shown in FIG. 5, the total viewing terminal number, the number of regions, and the viewing terminal number average value, which are calculated based on the viewing terminal number in each of the 15 regions shown in FIG. 4, are shown. The viewing terminal number average value calculated based on the viewing terminal number in each of the 15 regions is 2,993. Note that a value expressed as "Viewing terminal number average value×1.2" is 3,592. Further, a value expressed as "Viewing terminal number average value×0.8" is 2,395.

Referring to FIG. 4 again, in the example shown in FIG. 4, the viewing terminal number in each of the 15 regions and the advertisement display base time in each region calculated based on the viewing terminal number average value calculated in FIG. 5 are shown. For example, the viewing terminal number in Tokyo in Japan is 10,000, and is equal to or greater than the value expressed as "Viewing terminal number average value×1.2". Therefore, the advertisement display base time in Tokyo in Japan is set to 1 minute. Further, the viewing terminal number in New York in the United States is 3,000, and is equal to or greater than the value expressed as "Viewing terminal number average value×0.8" and less than the value expressed as "Viewing terminal number average value×1.2". Therefore, the advertisement display base time in New York in the United States is set to 45 seconds. Further, the viewing terminal number in Paris in France is 500, and is less than the value expressed as "Viewing terminal number average value µ×0.8" and is not zero. Therefore, the advertisement display base time in Paris in France is set to 30 seconds.

Note that in the steps S124, S126, and S128, the thresholds are set to the value expressed as "Viewing terminal number average value µ×1.2, the value expressed as "Viewing terminal number average value µ×0.8, and zero, respectively. However, the thresholds are not limited to these values and can be set independently of each other. For example, the factor by which the calculation unit 12 multiplies the viewing terminal number average value µ which is used in the determination in the step S124 is not limited to 1.2 and may be any value that is greater than one. Similarly, the factor by which the calculation unit 12 multiplies the viewing terminal number average value µ which is used in the determination in the step S126 is not limited to 0.8 and may be any value that is less than one. Further, in the steps S125, S127, S129, and S130, the advertisement display base time is set to 1 minute, 45 seconds, 30 seconds, and 0 seconds, respectively. However, the advertisement display base time is not limited to these values and can be set independently of each other. For example, the advertisement display base time set in the step S127 is not limited to 45 seconds and can be set to any duration as long as it is shorter than the advertisement display base time set in the step S125. Similarly, the advertisement display base time set in the step S129 is not limited to 30 seconds and can be set to any duration as long as it is shorter than the advertisement display base time set in the step S127. Note that in FIG. 3, the number of times of determinations of the viewing terminal number Xn is set to three, i.e., the determinations in the steps S124, S126 and S128, and the number of times of settings of the advertisement display base time based on the results of the determinations of the viewing terminal number Xn is set to four, i.e., the settings in the steps S125, S127, S129 and S1210. However, the number of times of determinations of the viewing terminal number Xn and the number of times of settings based on the results of determinations of the viewing terminal number Xn are not limited to the aforementioned values.

As described above, the advertisement display apparatus 10 according to the first embodiment dynamically controls, for each region, the advertisement display base time during which the advertisement or the like is displayed in viewing terminals 100 located in that region according to the number of viewing terminals 100 located in that region, i.e., the number of viewers present in that region. For example, an advertisement targeted for a region where the number of viewers is large is displayed on each viewing terminal 100. The advertisement display apparatus 10 calculates an advertisement display base time in such a manner that it becomes longer in a region where the number of viewer is large than in a region where the number of viewers is small. Therefore, the advertisement display apparatus 10 can efficiently display advertisements.

Note that the acquisition unit 11 of the advertisement display apparatus 10 may acquire information about contracted providers of viewing terminals 100. Then, the calculation unit 12 may calculate, for each provider, the number of viewing terminals 100 based on the information of that provider, and may dynamically control, for each region, the advertisement display base time during which the advertisement or the like is displayed in viewing terminals 100 located in that region according to the calculated number of viewing terminals 100. For example, the advertisement display apparatus 10 may increase the advertisement display base time of the advertisement and thereby provides an additional advertisement in viewing terminals 100 of which the user or the like uses a provider of which the contract fee is low. In this way, it is possible to enable the advertisement display apparatus 10 to efficiently display advertisements. Further, the advertisement display apparatus 10 may use information about carriers (e.g., telecommunication carriers) with which the users or the like of viewing terminals 100 under contract, instead of using information about providers.

Second Embodiment

Next, a configuration of an advertisement display apparatus 20 (not shown) according to a second embodiment will be described with reference to FIGS. 1 and 6-8. The advertisement display apparatus 20 has a configuration similar to that of the advertisement display apparatus 10 according to the first embodiment shown in FIG. 1, but also has the following function.

The storage unit 14 stores information about types of advertisements (hereinafter also referred to as advertisement type information). The advertisement type information is, for example, information indicating a type of advertisement such as an advertisement for alcohol or an advertisement for sports equipment. FIG. 6 shows an example of the advertisement type information in the advertisement display apparatus 20 according to the second embodiment. As shown in FIG. 6, the storage unit 14 stores advertisement IDs such as IDs 00001 to 00021 and advertisement types such as types A, B, C and D and "Not Designated" in association with each other. Note that "Not Designated" includes those that does not belong to any of the type A, B, C and D. Note that advertisement types can be set independently of each other.

Further, the storage unit 14 stores information about advertisement type coefficients (hereinafter also referred to as advertisement type coefficient information). The advertisement type coefficient information is information in which the degree of publicness (hereinafter also referred to as a publicness degree) of an advertisement is represented by a coefficient. That is, the advertisement type coefficient information is information of a predefined coefficient. Note that the publicness degree of an advertisement indicates a character or nature of the advertisement that give influences or interests to society in general. An advertisement having a high publicness degree is, for example, an advertisement having a character or nature that is likely to give influences or interests to society in general. Conversely, an advertisement having a low publicness degree is an advertisement having a character or nature that is not likely to give influences or interests to society in general. The higher the publicness degree of an advertisement is, the more it becomes an advertisement targeted for all regions. FIG. 7 shows an example of the advertisement type coefficient information in the advertisement display apparatus 20 according to the second embodiment. As shown in FIG. 7, advertisement types are associated with advertisement type coefficients such as coefficients 0.3, 0.5, 0.8 and 1.0. The larger the coefficient is, the more the publicness degree of the advertisement increases. Note that coefficients can be set independently of each other.

The acquisition unit 11 acquires information about a region where a viewing terminal(s) 100 is located from the IP address(es) or the like of the viewing terminal(s) 100. Further, the acquisition unit 11 acquires advertisement type information from the storage unit 14. Further, the acquisition unit 11 acquires advertisement type coefficient information from the storage unit 14.

The calculation unit 12 calculates the number of viewing terminals 100 in each region. The calculation unit 12 calculates, for each region, an advertisement display base time for that region based on the number of viewing terminals 100 located in that region. Further, the calculation unit 12 calculates, for each region, an advertisement display time based on the advertisement display base time and the advertisement type coefficient information in that region. Specifically, the calculation unit 12 calculates, for each region, an advertisement display time in that region based on the advertisement display base time and the advertisement type coefficient information in that region. For example, the calculation unit 12 selects an advertisement type coefficient corresponding to the advertisement type of advertisement to be displayed in viewing terminals 100 from the advertisement type, and calculates, for each region, an advertisement display time based on the advertisement display base time and the advertisement type coefficient information in that region by multiplying the advertisement display base time for that region by the advertisement type coefficient corresponding to the selected advertisement type of the advertisement.

The display control unit 13 displays the advertisement in viewing terminals 100 for the advertisement display time (i.e., for the duration of the advertisement display time) which is determined based on the advertisement display base time and the advertisement type coefficient information in that region.

Next, operations performed by the advertisement display apparatus 20 according to the second embodiment will be described with reference to FIG. 8.

Figure 8:
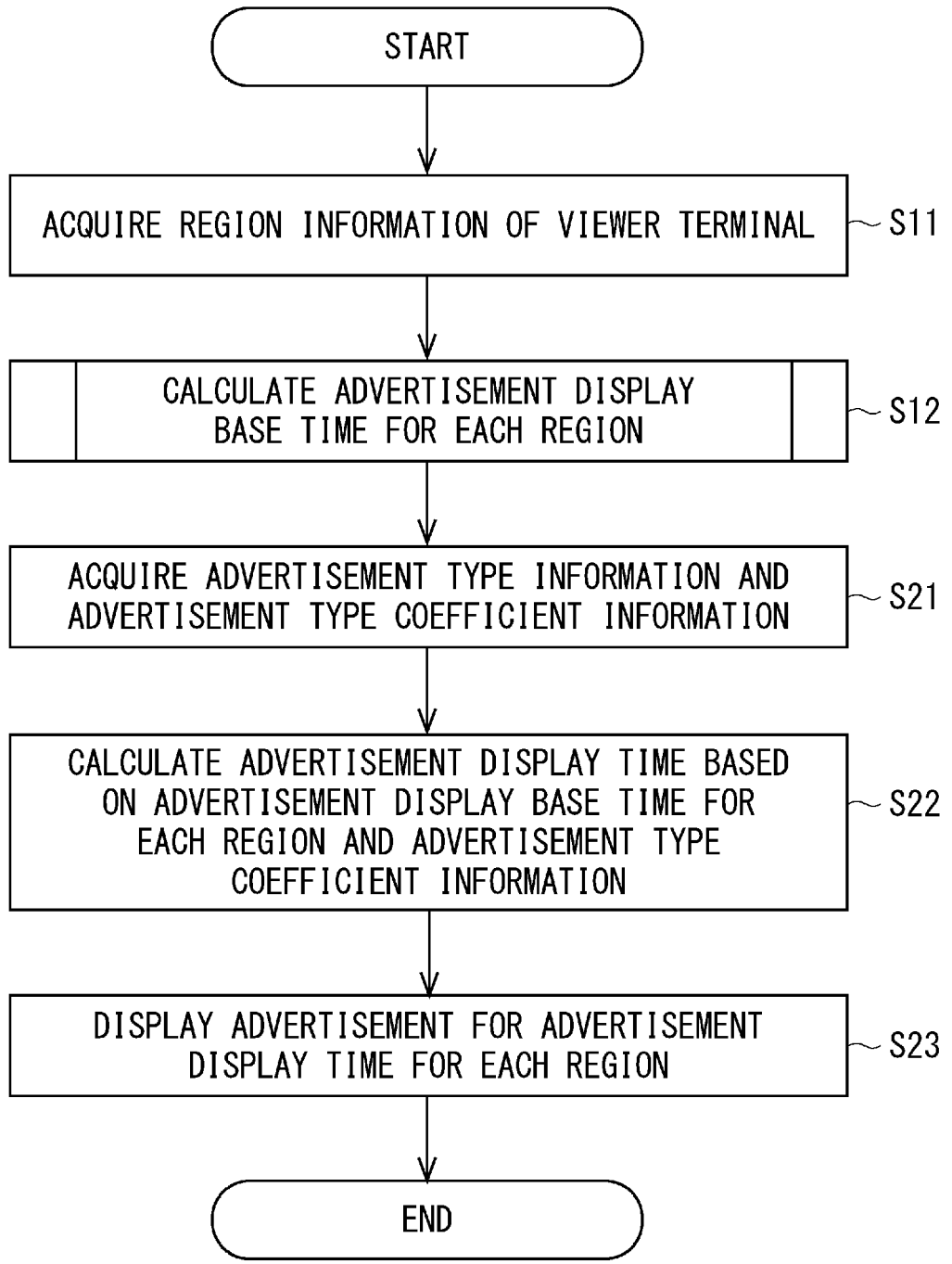
FIG. 8 is a flowchart showing an example of operations performed by the advertisement display apparatus 20 according to the second embodiment.

FIG. 8 is a flowchart showing an example of operations performed by the advertisement display apparatus 20 according to the second embodiment. As shown in FIG. 8, firstly, the acquisition unit 11 of the advertisement display apparatus 20 acquires region information of a viewing terminal(s) 100 (Step S11). Next, the calculation unit 12 calculates, for each region, an advertisement display base time for that region based on the acquired region information of the viewing terminal 100 (Step S12).

Next, the acquisition unit 11 acquires advertisement type information and advertisement type coefficient information from the storage unit 14 (Step S21).

Next, the calculation unit 12 calculates, for each region, an advertisement display time for that region based on the advertisement display base time and the advertisement type coefficient information in that region (Step S22). Specifically, the calculation unit 12 selects an advertisement type coefficient corresponding to the advertisement type of advertisement to be displayed in the viewing terminal 100 from the advertisement type, and calculates, for each region, an advertisement display time based on the advertisement display base time and the advertisement type coefficient information in that region by multiplying the advertisement display base time for that region by the advertisement type coefficient corresponding to the selected advertisement type of the advertisement.

For example, as shown in FIG. 4, the calculation unit 12 calculates (i.e., determines) that the advertisement display base time in Tokyo in Japan is 1 minute. As shown in FIGS. 6 and 7, when the advertisement ID of an advertisement to be displayed in viewing terminals 100 is an ID 00001 and its advertisement type is a type A, the calculation unit 12 calculates, as the advertisement display time, 1 minute that is obtained by multiplying the advertisement display base time, which is 1 minute, by the advertisement type coefficient 1.0. Further, when the advertisement ID of an advertisement to be displayed is an ID 00002 and its advertisement type is a type B, the calculation unit 12 calculates, as the advertisement display time, 0.8 minutes that is obtained by multiplying the advertisement display base time, which is 1 minute, by the advertisement type coefficient 0.8. Further, when the advertisement ID of an advertisement to be displayed is an ID 00006 and its advertisement type is a type C, the calculation unit 12 calculates, as the advertisement display time, 0.5 minutes that is obtained by multiplying the advertisement display base time, which is 1 minute, by the advertisement type coefficient 0.5. Further, when the advertisement ID of an advertisement to be displayed is an ID 00007 and its advertisement type is a type D, the calculation unit 12 calculates, as the advertisement display time, 0.3 minutes that is obtained by multiplying the advertisement display base time, which is 1 minute, by the advertisement type coefficient 0.3. When the advertisement ID of an advertisement to be displayed is an ID 00008 and its advertisement type is "Not Designated", the calculation unit 12 calculates, as the advertisement display time, 1.0 minute that is obtained by multiplying the advertisement display base time, which is 1 minute, by the advertisement type coefficient 1.0.

FIG. 8 will be described again. Next, the display control unit 13 displays, for each region, the advertisement in viewing terminals 100 for the advertisement display time (i.e., for the duration of the advertisement display time) which is determined based on the advertisement display base time and the advertisement type coefficient information in that region (Step S23).

As described above, the advertisement display apparatus 20 according to the second embodiment calculates an advertisement display time while taking the publicness degree of the advertisement into consideration, and displays the advertisement in viewing terminals 100 for the advertisement display time (i.e., for the duration of the advertisement display time). For example, the advertisement display apparatus 20 dynamically controls, for each region, the advertisement display base time for that region during which the advertisement is displayed in viewing terminals 100 located in that region according to the number of viewers present in that region, and further displays an advertisement having a high publicness degree in viewing terminals 100 for a longer advertisement display time than that for an advertisement having a low publicness degree. Therefore, the advertisement display apparatus 20 can display an advertisement more efficiently.

Third Embodiment

Next, a configuration of an advertisement display apparatus 30 (not shown) according to a third embodiment will be described with reference to FIGS. 1, 6, and 9-11. The advertisement display apparatus 30 has a configuration similar to that of the advertisement display apparatus 10 according to the first embodiment shown in FIG. 1, but also has the following additional function in addition to those of the advertisement display apparatus 10.

The storage unit 14 stores advertisement type information shown in FIG. 6.

Further, the storage unit 14 stores time zone-specific coefficient information of advertisements (hereinafter also referred to as time zone-specific coefficient information). The time zone-specific coefficient information is information in which for each advertisement type, a time zone suitable for displaying an advertisement in viewing terminals 100 is represented by a coefficient. FIG. 9 shows an example of the time zone-specific coefficient information in the advertisement display apparatus 30 according to the third embodiment. As shown in FIG. 9, the storage unit 14 stores, for each advertisement type, time zone-specific coefficients in association with the advertisement type. A time zone-specific coefficient is set for each of time zones such as time zones 1, 2, 3, 4 and 5. The time zone 1 is from 0:00 to 6:00; the time zone 2 is from 6:00 to 12:00; the time zone 3 is from 12:00 to 18:00; the time zone 4 is from 18:00 to 21:00; and the time zone 5 is from 21:00 to 0:00. For example, regarding the time zone-specific coefficients for the advertisement A, 0.1 is set to the time zone 1; 0.2 is set to the time zone 2; 0.5 is set to the time zone 3; 1.0 is set to the time zone 4; and 0.7 is set to the time zone 5. Further, for the time zone-specific coefficients for the advertisement B, 0.1 is set to the time zone 1; 1.0 is set to the time zone 2; 0.5 is set to the time zone 3; 0.2 is set to the time zone 4; and 0.7 is set to the time zone 5.

Further, the storage unit 14 stores time zone information for each region. FIG. 10 shows an example of time zone information for each region in the advertisement display apparatus 30 according to the third embodiment. For example, as shown in FIG. 10, for each region, one of the time zones 1 to 5 is set as the time zone for that region under the condition that the time zone in Japan is the time zone 4.

The acquisition unit 11 acquires information about a region where a viewing terminal(s) 100 is located from the IP address(es) or the like of the viewing terminal(s) 100. Further, the acquisition unit 11 acquires advertisement type information and time zone-specific coefficient information from the storage unit 14. Further, the acquisition unit 11 acquires time zone information for each region from the storage unit 14.

The calculation unit 12 calculates the number of viewing terminals 100 in each region. The calculation unit 12 calculates, for each region, an advertisement display base time for that region based on the number of viewing terminals 100 located in that region. Further, the calculation unit 12 calculates, for each region, an advertisement display time based on the advertisement display base time and the time zone-specific coefficient information in that region. Specifically, the calculation unit 12 calculates, for each region, an advertisement display time for that region based on the advertisement display base time and the time zone-specific coefficient in that region. For example, the calculation unit 12 selects an advertisement type of advertisement to be displayed in viewing terminals 100 and a time zone-specific coefficient corresponding to the time zone of the region where the viewing terminals 100 are located, and calculates, for each region, an advertisement display time based on the advertisement display base time and the time zone-specific coefficient for that region by multiplying the advertisement display base time for that region by the time zone-specific coefficient corresponding to the selected advertisement type of the advertisement and the time zone of the region where the viewing terminals 100 are located. Note that the calculation unit 12 may not use the advertisement type information when no advertisement type is assigned.

The display control unit 13 displays, for each region, an advertisement in viewing terminals 100 for an advertisement display time (i.e., for the duration of an advertisement display time) which is determined based on the advertisement display base time and the time zone-specific coefficient information in that region.

Next, operations performed by the advertisement display apparatus 30 according to the third embodiment will be described with reference to FIGS. 9 to 11.

Figure 11:
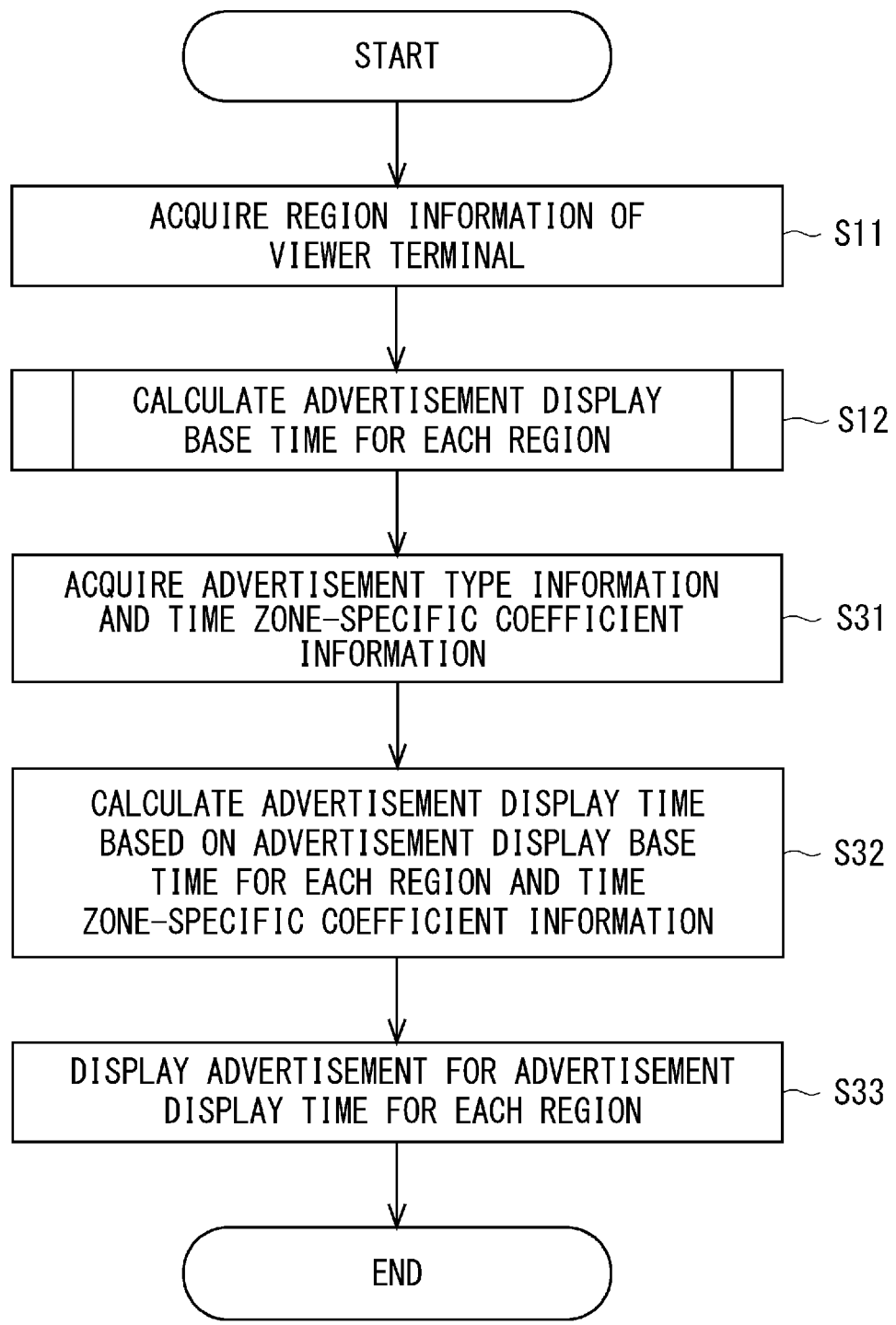
FIG. 11 is a flowchart showing an example of operations performed by the advertisement display apparatus 30 according to the third embodiment.

FIG. 11 is a flowchart showing an example of operations performed by the advertisement display apparatus 30 according to the third embodiment. As shown in FIG. 11, firstly, the acquisition unit 11 of the advertisement display apparatus 30 acquires region information of a viewing terminal(s) 100 (Step S11). Next, the calculation unit 12 calculates an advertisement display base time for each region based on the acquired region information of the viewing terminal 100 (Step S12).

Next, the acquisition unit 11 acquires advertisement type information and time zone-specific coefficient information (Step S31). Further, the acquisition unit 11 acquires time zone information for each region.

Next, the calculation unit 12 calculates, for each region, an advertisement display time for that region based on the advertisement display base time and the time zone-specific coefficient information in that region (Step S32). Specifically, the calculation unit 12 selects an advertisement type of advertisement to be displayed in viewing terminals 100 and a time zone-specific coefficient corresponding to the time zone of the region where the viewing terminals 100 are located, and calculates, for each region, an advertisement display time based on the advertisement display base time and the time zone-specific coefficient for that region by multiplying the advertisement display base time for that region by the time zone-specific coefficient corresponding to the selected advertisement type of the advertisement and the time zone of the region where the viewing terminals 100 are located.

Assume that, for example, the viewing terminal 100 is located in Tokyo in Japan, and the advertisement type of the advertisement to be displayed in this viewing terminal 100 is a type A. As shown in FIGS. 9 and 10, since the time zone of Tokyo in Japan is the time zone 4, the time zone-specific coefficient is 1.0. Further, as shown in FIG. 4, the advertisement display base time in Tokyo in Japan is 1 minute. Therefore, the calculation unit 12 calculates, as the advertisement display time of the advertisement A in Tokyo in Japan, 1.0 minute that is obtained by multiplying the advertisement display base time, which is 1 minute, by the time zone-specific coefficient 1.0. Further, assume that the viewing terminal 100 is located in Tokyo in Japan, and the advertisement type of the advertisement to be displayed in this viewing terminal 100 is a type B. As shown in FIGS. 9 and 10, since the time zone of Tokyo in Japan is the time zone 4, the time zone-specific coefficient is 0.2. Further, as shown in FIG. 4, the advertisement display base time in Tokyo in Japan is 1 minute. Therefore, the calculation unit 12 calculates, as the advertisement display time of the advertisement B in Tokyo in Japan, 0.2 minutes that is obtained by multiplying the advertisement display base time, which is 1 minute, by the time zone-specific coefficient 0.2.

FIG. 11 will be described again. Next, the display control unit 13 displays, for each region, the advertisement in viewing terminals 100 for the advertisement display time (i.e., for the duration of the advertisement display time) which is determined based on the advertisement display base time and the time zone-specific coefficient in that region (Step S33).

Note that although the advertisement display apparatus 30 calculates an advertisement display time based on the time zone for each region, it may calculate an advertisement display time based on the season of each region.

As described above, the advertisement display apparatus 30 according to the third embodiment dynamically controls, for each region, the advertisement display base time for that region during which the advertisement is displayed in viewing terminals 100 located in that region according to the number of viewers present in that region, and further displays an advertisement suitable for the time zone in the region where the viewing terminals 100 are located in the viewing terminals 100 for a longer advertisement display time than that for an advertisement that is not suitable for the time zone in the region where the viewing terminals 100 are located. For example, it is expected that an advertisement for alcohol will get more responses from viewers when it is displayed at night (18:00 to 21:00). The advertisement display apparatus 30 displays such an advertisement for alcohol for a longer duration in that time zone than the duration in the other time zones. Therefore, the advertisement display apparatus 30 can display an advertisement more efficiently.

Fourth Embodiment

Next, a configuration of an advertisement display apparatus 40 (not shown) according to a fourth embodiment will be described with reference to FIGS. 1, 6, 7, 9, 10 and 12. The advertisement display apparatus 40 has a configuration similar to that of the advertisement display apparatus 10 according to the first embodiment shown in FIG. 1. The advertisement display apparatus 40 is one that is obtained by combining the functions of the advertisement display apparatuses 20 and 30, and includes the following additional function.

The storage unit 14 stores advertisement type information, advertisement type coefficient information, and time zone-specific coefficient information for advertisements. Further, the storage unit 14 stores time zone information for each region.

The acquisition unit 11 acquires information about a region where a viewing terminal(s) 100 is located from the IP address(es) or the like of the viewing terminal(s) 100. Further, the acquisition unit 11 acquires advertisement type information, advertisement type coefficient information, and time zone-specific coefficient information from the storage unit 14. Further, the acquisition unit 11 acquires time zone information in each region from the storage unit 14.

The calculation unit 12 calculates the number of viewing terminals 100 in each region. The calculation unit 12 calculates, for each region, an advertisement display base time for that region based on the number of viewing terminals 100 located in that region. The calculation unit 12 calculates, for each region, an advertisement display time based on the advertisement display base time, the advertisement type coefficient information, and the time zone-specific coefficient information in that region. Specifically, the calculation unit 12 calculates, for each region, an advertisement display time for that region based on the advertisement display base time, the advertisement type coefficient information, and the time zone-specific coefficient information in that region. For example, the calculation unit 12 selects an advertisement type coefficient corresponding to the advertisement type of advertisement to be displayed in viewing terminals 100 from the advertisement type, and selects an advertisement type of the advertisement to be displayed in the viewing terminals 100 and a time zone-specific coefficient corresponding to the time zone of the region where the viewing terminals 100 are located. Then, the calculation unit 12 calculates, for each region, an advertisement display time based on the advertisement display base time, the advertisement type coefficient information, and the time zone-specific coefficient for that region by multiplying the advertisement display base time for that region by the advertisement type coefficient corresponding to the selected advertisement type of the advertisement and the time zone-specific coefficient corresponding to the time zone of the region where the viewing terminals 100 are located.

The display control unit 13 displays, for each region, an advertisement in viewing terminals 100 for an advertisement display time (i.e., for the duration of an advertisement display time) which is determined based on the advertisement display base time, the advertisement type coefficient information, and the time zone-specific coefficient information in that region.

Next, operations performed by the advertisement display apparatus 40 according to the fourth embodiment will be described with reference to FIG. 12.

Figure 12:
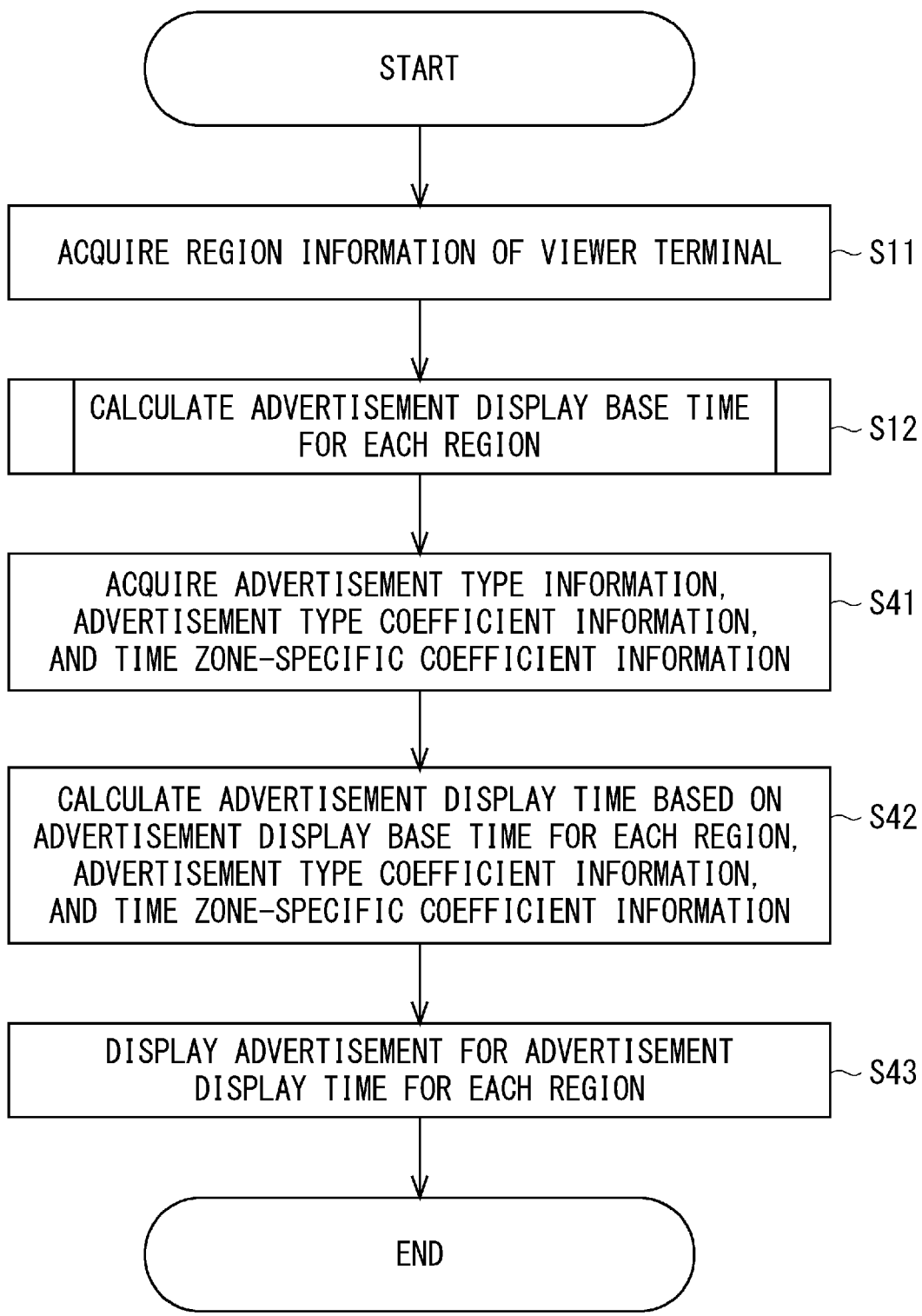
FIG. 12 is a flowchart showing an example of operations performed by an advertisement display apparatus 40 according to a fourth embodiment.

FIG. 12 is a flowchart showing an example of operations performed by the advertisement display apparatus 40 according to the fourth embodiment. As shown in FIG. 12, firstly, the acquisition unit 11 of the advertisement display apparatus 40 acquires region information of a viewing terminal(s) 100 (Step S11). Next, the calculation unit 12 calculates an advertisement display base time for each region based on the acquired region information of the viewing terminal 100 (Step S12).

Next, the acquisition unit 11 acquires advertisement type information, advertisement type coefficient information, and time zone-specific coefficient information from the storage unit 14 (Step S41). Further, the acquisition unit 11 acquires time zone information for each region from the storage unit 14.

The calculation unit 12 calculates, for each region, an advertisement display time for that region based on the advertisement display base time, the advertisement type coefficient information, and time zone-specific coefficient information in that region (Step S42). Specifically, the calculation unit 12 selects an advertisement type coefficient corresponding to the advertisement type of advertisement to be displayed in viewing terminals 100 from the advertisement type, and selects an advertisement type of the advertisement to be displayed in the viewing terminals 100 and a time zone-specific coefficient corresponding to the time zone of the region where the viewing terminals 100 are located. Then, the calculation unit 12 calculates, for each region, an advertisement display time based on the advertisement display base time, the advertisement type coefficient information, and the time zone-specific coefficient for that region by multiplying the advertisement display base time for that region by the advertisement type coefficient corresponding to the selected advertisement type of the advertisement and the time zone-specific coefficient corresponding to the time zone of the region where the viewing terminals 100 are located.

FIG. 12 will be described again. Next, the display control unit 13 displays, for each region, the advertisement in viewing terminals 100 for the advertisement display time (i.e., for the duration of the advertisement display time) which is determined based on the advertisement display base time, the advertisement type coefficient information, and the time zone-specific coefficient information in that region (Step S43).

As described above, the advertisement display apparatus 40 according to the fourth embodiment dynamically controls, for each region, the advertisement display base time for that region during which the advertisement is displayed in viewing terminals 100 located in that region according to the number of viewers in that region, and further displays an advertisement having a high publicness degree and an advertisement suitable for the time zone for the region where the viewing terminals 100 are located in the viewing terminals 100 for a longer advertisement display time than that for an advertisement having a low publicness degree and an advertisement that is not suitable for the time zone for the region where the viewing terminals 100 are located. Therefore, the advertisement display apparatus can display an advertisement more efficiently.

Fifth Embodiment

Figure 13:
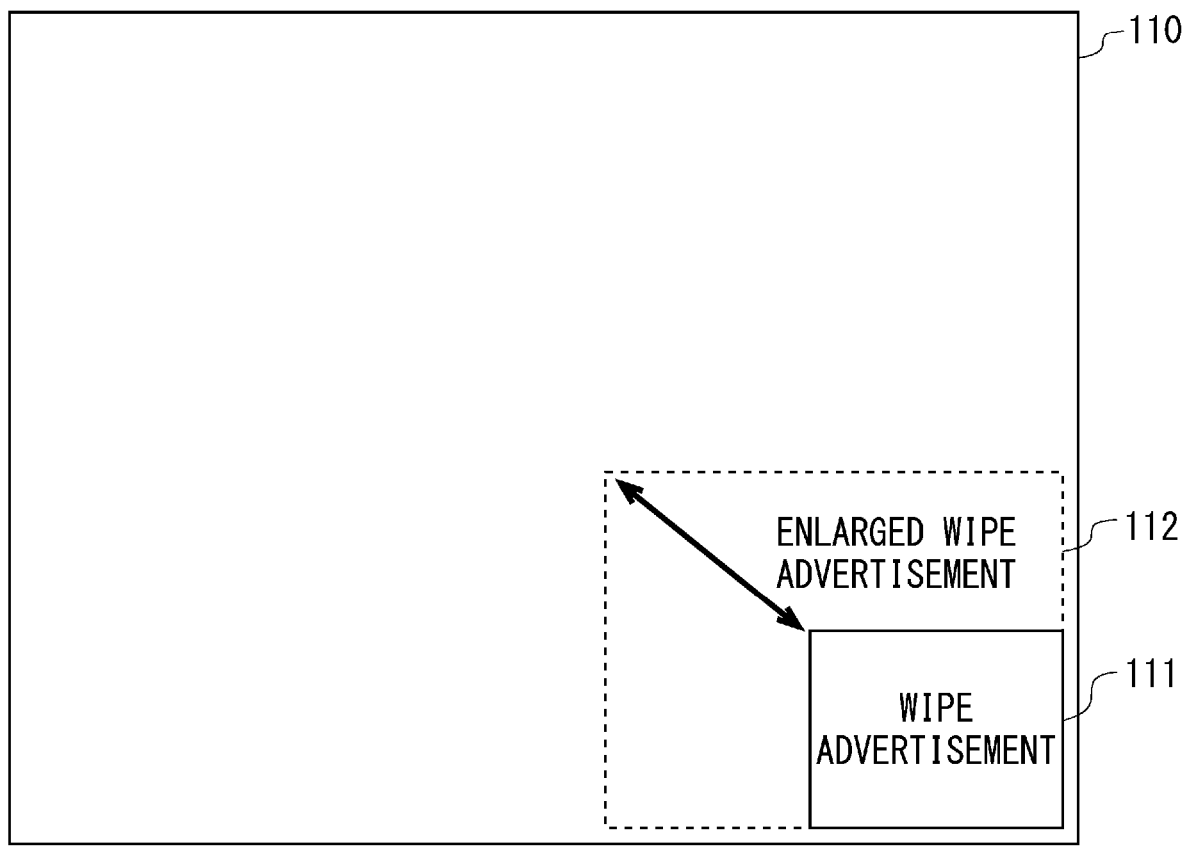
FIG. 13 is a schematic diagram for explaining an example of an advertisement display method according to a fifth embodiment.
Figure 14:
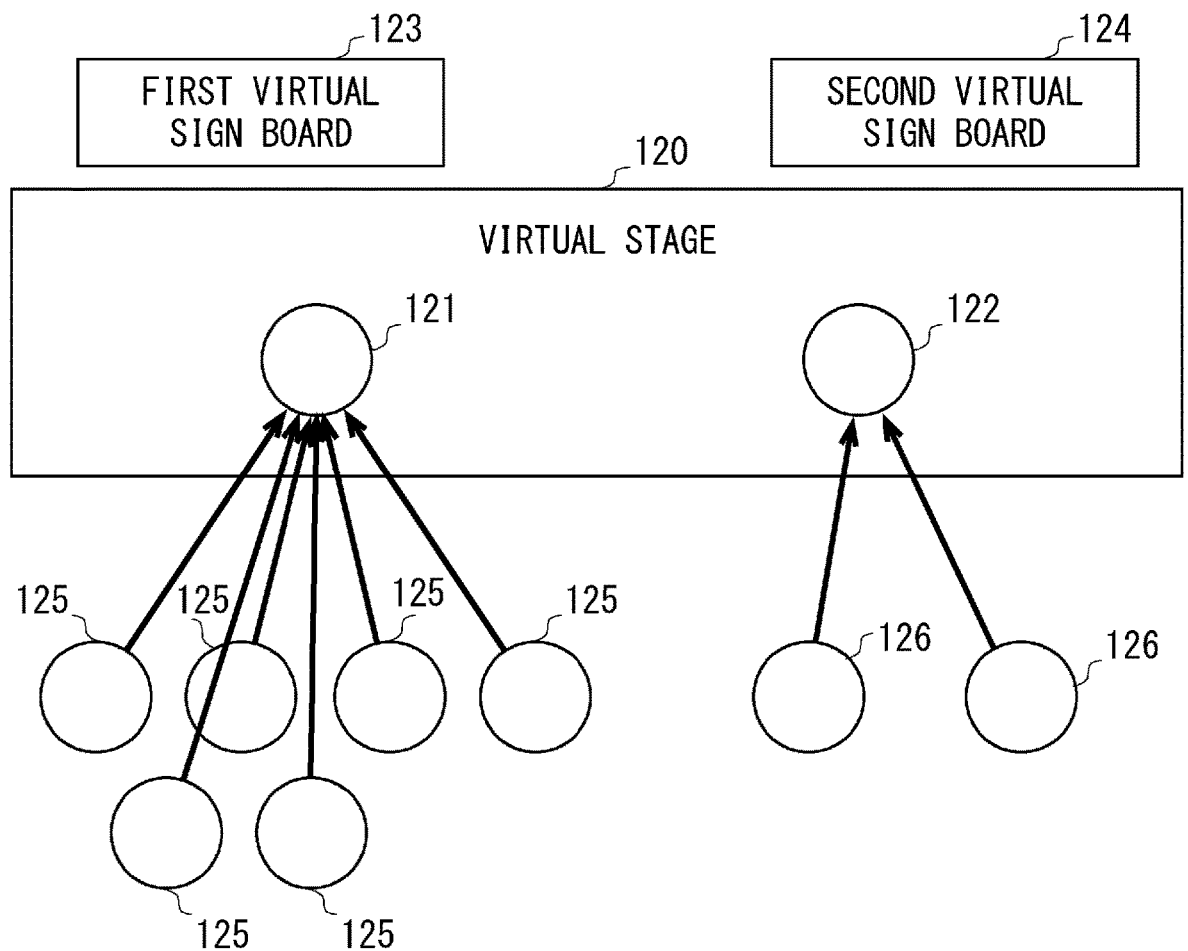
FIG. 14 is a schematic diagram for explaining another example of an advertisement display method according to the fifth embodiment.

As a fifth embodiment, an example of a display method that can be applied to any of the advertisement display apparatuses according to the first to fourth embodiments will be described with reference to FIGS. 13 and 14. FIG. 13 is a schematic diagram for explaining an example of an advertisement display method according to the fifth embodiment. FIG. 14 is a schematic diagram for explaining another example of an advertisement display method according to the fifth embodiment. Although an example of a display method performed in the advertisement display apparatus 10 according to the first embodiment will be described hereinafter as an example of the display method according to this embodiment, the below-described display method can also be applied to any of the advertisement display apparatuses according to the second to fourth embodiments.

Firstly, an example of a display method for displaying a wipe advertisement on a video image will be described with reference to FIG. 13. As shown as an example in FIG. 13, the display control unit 13 of the advertisement display apparatus 10 incorporates a wipe advertisement 111 into a video image 110 provided (i.e., displayed) in a viewing terminal(s) 100. The wipe advertisement 111 may be, for example, provided (i.e., displayed) in the viewing terminal 100 at a lower right part of the video image 110 in a superimposed manner.

Further, the display control unit 13 may display the wipe advertisement 111 in the viewing terminal 100 in such a state that the larger the viewing terminal number Xn or the viewing terminal number average value $\mu$ is, the more the wipe advertisement is enlarged like an enlarged wipe advertisement 112. In this way, the more the wipe advertisement is viewed, the more the advertisement effect can be obtained. Conversely, the display control unit 13 may display the wipe advertisement 111 in the viewing terminal 100 in such a state that the smaller the viewing terminal number Xn or the viewing terminal number average value $\mu$ is, the more the wipe advertisement is enlarged like the enlarged wipe advertisement 112. In this way, a constant advertisement effect can be obtained irrespective of the number of viewers or the like.

As described above, the display control unit 13 may display an advertisement such as a wipe advertisement in a viewing terminal(s) 100 while changing the display size of the advertisement such as the displayed wipe advertisement based on the viewing terminal number Xn, e.g., according to the viewing terminal number Xn or the viewing terminal number average value u. Note that changing of the display size of the wipe advertisement according to the viewing terminal number Xn means that the sizes of wipe advertisements in a plurality of regions of which the viewing terminal numbers Xn differ from each other differ from each other. Further, the display control unit 13 preferably change the wipe advertisement while setting an upper limit and a lower limit for the display size or the display ratio to the original video image so that the advertisement does not hide most of the video image or the advertisement to be displayed is too small to be visually recognized.

Next, an example of a display method in an advertisement space in a virtual space will be described with reference to FIG. 14. An example where the virtual space is a virtual live venue (e.g., virtual concert hall) where avatars 121 and 122 of performers are playing musical instruments or the like on a virtual stage 120 as shown in FIG. 14 will be described hereinafter. As shown as an example in FIG. 14, the display control unit 13 of the advertisement display apparatus 10 displays an advertisement(s) on a first virtual signboard 123 and a second virtual signboard 124 provided on the back side (or far side) of the virtual stage 120 as viewed from avatars 125 and 126 of audiences. In the viewing terminal 100, it is possible to view a virtual live (e.g., a virtual concert) including such an advertisement. Further, in the virtual live venue, one or a plurality of viewing terminals 100 may be displayed while associating each of the viewing terminals with a respective one of the avatars 125 and 126 of the audiences. Note that the virtual space itself may be provided by an apparatus other than the advertisement display apparatus 10.

Further, in the example shown in FIG. 14, for the sake of explanation, the lines of sight of the avatars 125 and 126 of the audiences are indicated by arrows. The line of sight (i.e., each of the lines of sight) can be obtained by a line-of-sight sensor installed in, for example, a smartphone, a VR (Virtual Reality) goggle or a VR headset which serves as the viewing terminal 100 of the audience. As described above, the virtual live venue may be a venue where the avatar 125 of an audience viewing the avatar 121 of a performer and the avatar 126 of an audience viewing the avatar 122 of another performer are present. The avatars 121 and 122 of the performers can move individually of each other, and the avatars 125 and 126 of the audiences can also move individually of each other. Therefore, it can be said that FIG. 14 shows a state at a certain point of time.

In this example, an audience can selectively view a video image according to the detected his/her line of sight. That is, the video image provided (i.e., displayed) in the viewing terminal 100 becomes a video image by which a partial area can be selectively viewed by the viewing terminal 100. In this case, the calculation unit 12 preferably calculate, for each of the above-described partial areas, the number of viewing terminals in each region based on information about regions where viewing terminals 100 are located. Then, the calculation unit 12 may calculate, for each of the above-described partial regions, the display time of an advertisement(s) for each region based on the number of viewing terminals 100 in each region. In this way, it is possible, even for a video image of which a user can select to view a partial area from a viewing terminal 100, to calculate the display time of an advertisement(s) in each region according to the selection.

An example of such calculation will be described in detail. For example, the acquisition unit 11 acquires information about the region of the viewing terminal 100 corresponding to the avatar 125 of the audience who is viewing the avatar 121 of the performer, and the calculation unit 12 calculates the display time of an advertisement for each region based on this information about the region. Which of the avatars 121 and 122 the audience is viewing can be obtained from, for example, the line of sight of the audience as described above. Then, based on the display time of the advertisement for each region calculated in this way, the display control unit 13 displays the advertisement on the first virtual signboard 123 installed on the back side of the avatar 121.

Similarly, the acquisition unit 11 acquires information about the region of the viewing terminal 100 corresponding to the avatar 126 of the audience who is viewing the avatar 122 of the performer, and the calculation unit 12 calculates the display time of an advertisement for each region based on this information about the region. Then, based on the display time of the advertisement for each region calculated in this way, the display control unit 13 displays the advertisement on the second virtual signboard 124 installed on the back side of the avatar 122.

Note that in this virtual live venue, an audience who generally watches the whole virtual stage 120 including both avatars 121 and 122 may be counted as audiences for both the first and second virtual signboards 123 and 124, and the display time of the advertisement for each region may be calculated based thereon.

Further, as described above, it can be said that FIG. 14 shows a state at a certain point of time. Therefore, the result of the processing such as the above-described calculation of the display time can also be changed according to at least one of the change in movement and the change in line of sight of the audience.

Further, each of the first and second virtual signboards 123 and 124 in the example shown in FIG. 14 may be a virtual monitor that displays a video image of the whole live performance. In this case, the advertisement may be displayed on the first and second virtual signboards 123 and 124 as a wipe advertisement or the like as shown in FIG. 13.

Further, the virtual live venue including the virtual stage 120 where the avatars 121 and 122 are performing is used as an example of the virtual space. However, for example, it is possible to display, in a virtual space including virtual signboards such as the first and second virtual signboards 123 and 124, a live image of a real performer performing on a real stage.

In the example shown in FIG. 14, it is possible to achieve effects like those described above in the first to fourth embodiments even in a system in which a partial area is selectively viewed by a viewing terminal, such as the above-described virtual space.

<Hardware Configuration>

Each of the components/structures in the above-described embodiments may be formed by software, hardware, or both of them. Further, each of the apparatuses may be formed by one hardware device or one software program, or a plurality of hardware devices or a plurality of software programs. Each apparatus and each function (process) may be implemented by a computer including a processor such as a CPU (Central Processing Unit), and a memory, which is a storage device. For example, a program for performing a method in an example embodiment may be stored in the memory, and each function may be implemented by having the processor execute the program stored in the memory.

Such programs include a set of instructions (or software codes) that, when being loaded into a computer, causes the computer to perform one or more of the functions described in the embodiments. The program may be stored in a non-transitory computer readable medium or in a physical storage medium. By way of example rather than limitation, a computer readable medium or a physical storage medium may include a random-access memory (RAM), a read-only memory (ROM), a flash memory, a solid-state drive (SSD), or other memory technology, a CD-ROM, a digital versatile disk (DVD), a Blu-ray (registered trademark) disc or other optical disc storages, a magnetic cassette, magnetic tape, and a magnetic disc storage or other magnetic storage devices. The program may be transmitted on a transitory computer readable medium or a communication medium. By way of example rather than limitation, the transitory computer readable medium or the communication medium may include electrical, optical, acoustic, or other forms of propagating signals.

Note that the present disclosure is not limited to the above-described embodiments and various modifications can be made thereto within the scope and spirit of the disclosure.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An advertisement display apparatus comprising:
   an acquisition unit configured to acquire information about a region where a viewing terminal is located; and
   a calculation unit configured to calculate, for each region where a viewing terminal is located, a number of viewing terminals in that region based on information about that region, and calculate, for each region, a display time of an advertisement in that region such that the display time of the advertisement is longer in a region having a larger number of viewing terminals in that region.

2. The advertisement display apparatus according to claim 1, wherein the calculation unit further calculates an average value of the number of viewing terminals in that each region, and calculates a display time of the advertisement in that each region based on a comparison between the number of viewing terminals in that each region and the average value.

3. The advertisement display apparatus according to claim 1, wherein
   the acquisition unit acquires time zone information for each region, and
   the calculation unit calculates the display time of the advertisement based on the time zone information for each region.

4. The advertisement display apparatus according to claim 1, further comprising a display control unit configured to change a display size of the advertisement based on the calculated number of viewing terminals in each region, and display the advertisement having the changed display size in the viewing terminal.

5. The advertisement display apparatus according to claim 1, wherein
   a video image provided to the viewing terminal is a video image of which a user can selectively view a partial area by the viewing terminal, and
   the calculation unit calculates, for each partial area, the number of viewing terminals in each area based on information about a region where the viewing terminal is located, and calculates, for each partial area, the display time of the advertisement for each region based on the number of viewing terminals in each area.

6. A method wherein a computer:
   acquires information about a region where a viewing terminal is located; and
   calculates, for each region where a viewing terminal is located, a number of viewing terminals in that region based on information about that region, and calculates, for each region, a display time of an advertisement in that region such that the display time of the advertisement is longer in a region having a larger number of viewing terminals in that region.

7. A non-transitory computer readable medium storing a program for causing a computer to:
   acquire information about a region where a viewing terminal is located; and
   calculate, for each region where a viewing terminal is located, a number of viewing terminals in that region based on information about that region, and calculate, for each region, a display time of an advertisement in that region such that the display time of the advertisement is longer in a region having a larger number of viewing terminals in that region.

* * * * *